US010062119B2

(12) United States Patent
Groeneveld

(10) Patent No.: US 10,062,119 B2
(45) Date of Patent: Aug. 28, 2018

(54) METHOD FOR AUTOMATED CROP INSURANCE LOSS ADJUSTING FOR PREVENTED PLANTING CONDITIONS

(71) Applicant: David P. Groeneveld, Santa Fe, NM (US)

(72) Inventor: David P. Groeneveld, Santa Fe, NM (US)

(*) Notice: Subject to any disclaimer, the term of this patent is extended or adjusted under 35 U.S.C. 154(b) by 368 days.

(21) Appl. No.: 14/830,552

(22) Filed: Aug. 19, 2015

(65) Prior Publication Data

US 2016/0055592 A1 Feb. 25, 2016

Related U.S. Application Data

(60) Provisional application No. 62/041,463, filed on Aug. 25, 2014.

(51) Int. Cl.
*G06Q 40/06* (2012.01)
*G06Q 40/08* (2012.01)
*G06Q 50/02* (2012.01)

(52) U.S. Cl.
CPC ............ *G06Q 40/08* (2013.01); *G06Q 40/06* (2013.01); *G06Q 50/02* (2013.01)

(58) Field of Classification Search
CPC ...................................................... G06Q 40/08
USPC ............................................................ 705/4
See application file for complete search history.

(56) References Cited

U.S. PATENT DOCUMENTS

| 7,184,892 | B1 | 2/2007 | Dyer et al. | |
|---|---|---|---|---|
| 2002/0173980 | A1* | 11/2002 | Daggett | G06Q 10/10 705/4 |
| 2011/0295575 | A1* | 12/2011 | Levine | G06Q 30/02 703/2 |
| 2012/0290140 | A1 | 11/2012 | Groeneveld | |
| 2012/0310679 | A1 | 12/2012 | Olson et al. | |
| 2012/0330733 | A1* | 12/2012 | Tiller | G06Q 10/10 705/14.4 |
| 2015/0073716 | A1* | 3/2015 | Johnson | G06Q 50/02 702/19 |
| 2015/0278966 | A1 | 10/2015 | Johnson | |

OTHER PUBLICATIONS

7. Esri GIS for Insurance Mar. 2012.*
8. The Potential and Uptake of Remote Sensing in Insurance: A Review May 25, 2014.*
9. What is a GIS esri Ireland Mar. 26, 2012.*

* cited by examiner

*Primary Examiner* — William E Rankins

(57) ABSTRACT

Prevented planting (PP), where wet conditions during the planting season prevent access to farmed fields, costs the United States an average of many hundreds of millions of dollars in crop losses each year. Crop insurance indemnifies most of the losses of PP on farmed land in the US. This system, method, and product uses Earth observation satellite data and geographic information system technology to provide automated PP crop-loss adjusting performed digitally to enhance crop loss adjusting efficiency, reduce loss-adjusting costs, assess crop losses across large geographic regions to forecast financial set asides to meet claim payouts, and parse data to all interested parties.

6 Claims, 4 Drawing Sheets

METHOD FOR AUTOMATED CROP INSURANCE LOSS ADJUSTING FOR PREVENTED PLANTING CONDITIONS

RELATED APPLICATIONS

This application claims the benefit of U.S. Patent Application No. 62/041,463, filed Aug. 21, 2014. This provisional patent application listed above is incorporated herein by reference in its entirety.

BACKGROUND OF THE INVENTION

Prevented planting (PP), where the act of planting the seed is either rendered impractical or impossible, can occur for conditions that are either too wet or too dry. Although extremely dry conditions can trigger PP loss claims, far more commonly, prevented planting conditions occur when the farmer's field is too wet to permit entry of the planting equipment. PP from waterlogged fields can cause serious losses for the farmer because crops must be planted within a crop-specific window in order to provide a sufficiently long growth period to achieve a yield prior to fall frost. This system, method, and product deals solely with PP under wet conditions. PP from wet conditions creates an average of hundreds of millions of dollars in crop losses each year across the United States (US), often reaching very high density and nearly total involvement of cultivated fields in the wettest locations.

Crop insurance policies indemnify farmers from losses due to PP. Once a PP loss occurs, the Approved Insurance Provider (AIP) must determine the amount of loss for each claimed field in a process called loss adjusting. Currently, loss adjusters are sent to each field that is impacted, frequently requiring travel and lodging support that, in aggregate, may cost each insurance company many tens of millions of dollars in each affected state in addition to amounts that must be paid out for indemnities. Furthermore, on-the-ground estimation of the size of many disconnected areas within each PP-impacted field is time consuming and often inaccurate for a loss adjuster in the field. There is an urgent need for a system, method, and product to provide automated PP crop loss adjusting that is accurate, robust, and that largely obviates the need for field visits. Accurate, automated, digital methods can save AIPs significant costs for PP loss adjusting. This savings can potentially be passed on to farmers, thereby enhancing the economics of farming while strengthening United States (US) agriculture.

BRIEF SUMMARY OF THE INVENTION

Prevented planting occurs when regional fields are too wet to enter and in some years across many tens of thousands of square miles. The present invention answers the need for accurate automated adjustment of prevented planting claims that average hundreds of millions of dollars annually, commonly overwhelming regional crop loss adjusting staff, the AIPs that field them, and the timely pay out of the indemnities.

Following the filing of PP claims, Earth observation satellite data are obtained for a point in time after canopy closure occurs for crops grown in the affected region, occurring In the US during the first week of July. Using an automated computer algorithm, EOS data are processed to an atmospherically-resistant vegetation index, for example NDVI*, and then subjected to a threshold calibrated to differentiate areas of satisfactory and acceptable crop cover from areas with no, or limited cover that failed due to PP. The area of the PP loss is then summed and the indemnity for the lost crop is calculated. The data developed for crop loss adjustment on each field and the calculated indemnity are then used by the AIP to pay the claim, document the adjustment, and in the case of a challenge to the adjustment, used to defend the indemnity. This automated process enhances efficiency, rapid payment of the claim and saves potentially huge adjusting costs for a system that is presently overwhelmed during wet years.

ABBREVIATIONS AND DEFINITIONS

Figure 1:
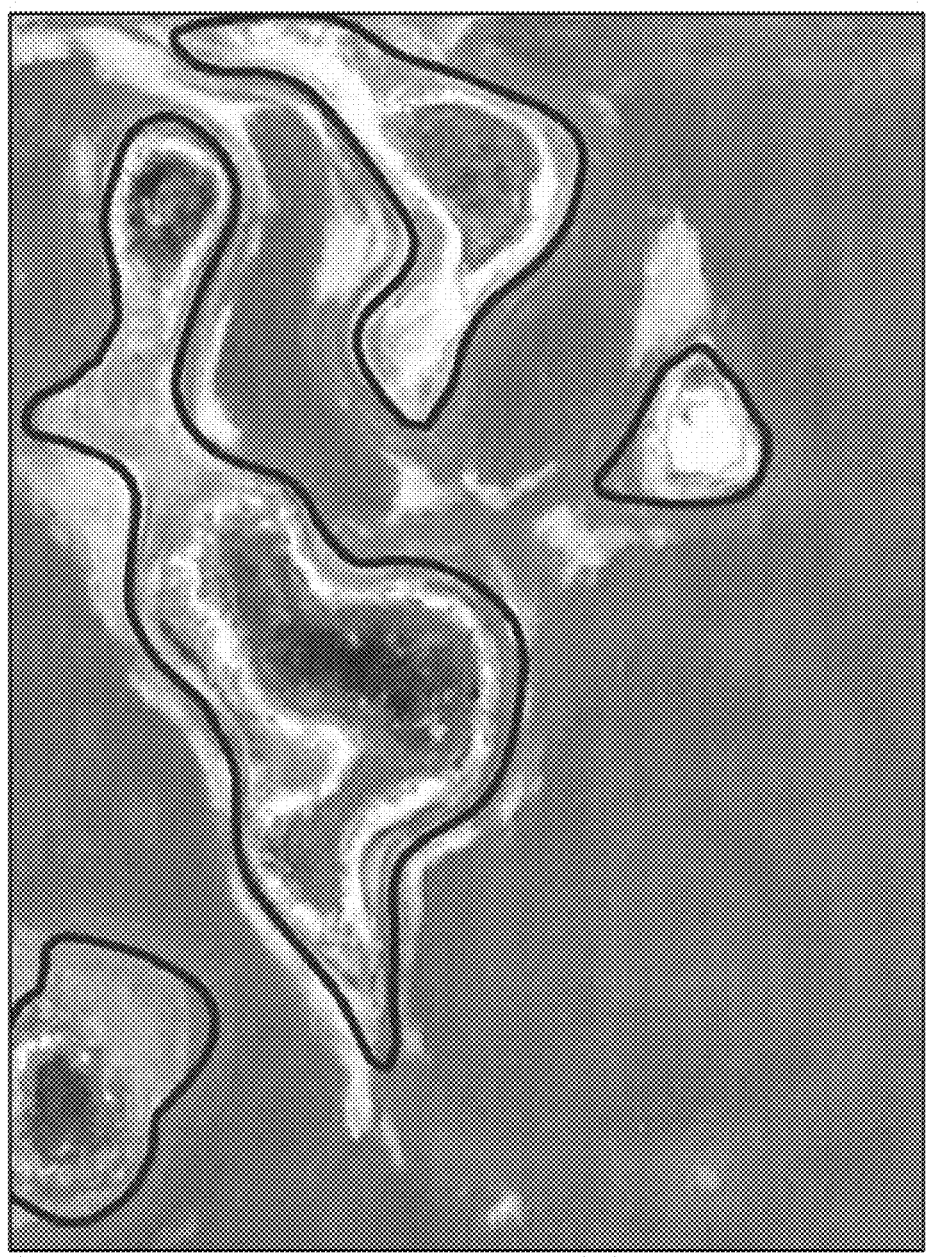
FIG. 1. A 6.6 acre portion of a cropped North Dakota field with prairie potholes delineated and with light-colored non-crop supporting surrounding areas affected by PP displayed on 2012 NAIP imagery.

AIP—Authorized Insurance Provider, companies that have received authorization from the Risk Management Agency.

AOI—Area of interest.

Competent Crop—a crop that is acceptable and satisfactory.

DEM—digital elevation model, positional data that are stored as rasters with x and y recording the position on the Earth's surface and z dimension storing the surface elevation.

EOS—Earth observation satellite. A vehicle operated above the Earth's surface collecting data in at least the red and near-infrared regions of the spectrum that, in combination, are used to evaluate the vigor of vegetation canopies.

Field m—term for a generic field processed within the present art.

GIS—geographic information system is a computer and software system for capturing, storing, checking, and displaying data related to positions on Earth's surface.

Indemnity—insurance payment to compensate for a loss

PP—prevented planting, a condition that either prevents a crop from being planted or causes the failure of a newly planted crop, most commonly from water logged soils.

RMA—Risk Management Agency of the United States Department of Agriculture, the responsible agency for administering crop insurance.

Shapefile—a common standard for representing geospatial vector data.

DETAILED DESCRIPTION

Prevented planting results in skipped locations where seeds were not planted, but also includes locations that were planted but resulted in drowned plants, for example caused by waterlogging due to a rising water table—both causes are indemnified as PP. Areas of fields that could not be planted, or were planted and subsequently failed, can be accurately mapped using Earth observation satellite (EOS) data during mid-growing season (for example during early July). Manned or unmanned aircraft are included here within the term EOS because such vehicles offer a platform to deliver the same type of data as EOS, only operated closer to the Earth's surface.

The location of failed crops is detectable using EOS-derived vegetation indices that can differentiate a growing, verdant crop canopy from zero, or near-zero plant cover in zones with no crops or failed crops due to PP. Discrimination of a successful versus failed crop can be made simply and robustly by applying a vegetation index threshold. The waterlogging conditions of PP cause failure of both crops and weeds, leaving the ground surface bare, or nearly so. Hence, using digital techniques in a computer, prevented-planting-induced crop failure can be accurately mapped and summed to calculate the indemnity within insured cropped fields. In most cases, this crop loss adjustment can be performed as an automated procedure.

Use of EOS Data and Vegetation Indices

Vegetation indices, for example the normalized difference vegetation index (NDVI) are commonly used for discriminating verdant from less verdant vegetation. Of the published vegetation indices, NDVI is overwhelmingly the most common. The mathematics for NDVI is presented in Equation 1.

$$NDVI = \frac{NIR - Red}{NIR + Red} \qquad \text{Equation 1}$$

Where NIR is the near infrared band and Red is the red band of EOS reflectance contained on virtually all EOS platforms.

Due to the effects of atmospheric absorption and attenuation, NDVI may have significant variability among days even though the target reflectance of the crop has remained constant. Removal of atmospheric effects in NDVI can be accomplished by calculation of NDVI* that is performed using scene statistics according to Equation 2.

$$NDVI^* = \frac{NDVI_i - NDVI_0}{NDVI_S - NDVI_0} \qquad \text{Equation 2}$$

Where $NDVI_i$ is the measured NDVI for the ith pixel, $NDVI_S$ is the saturated value for NDVI, and $NDVI_0$ is the NDVI value representing bare soil.

Conversion to NDVI* is an important step for the present invention because thresholds are used to discriminate between a healthy crop that was planted and portions of the field that failed to produce a crop because of PP conditions. NDVI* assures that the same threshold can be used to discriminate PP, without regard to atmospheric conditions as long as the image is clear of clouds or readily visible haze. Other vegetation indices can be used for discriminating PP areas, however, a transform similar to NDVI* must be used to assure accuracy.

Use of NDVI* or similar atmospherically-corrected vegetation indices for discriminating and mapping prevented-planting-caused crop failure is performed four weeks, or so, after the planting period in order to allow the competent crop to exhibit a verdant canopy, competent in this context meaning acceptable and satisfactory. The timing for this may vary according to crop and planting date. The verdant canopy creates a reliable spectral difference from areas of PP that tend to remain bare or support only light growth of weeds. For all crops in North and South Dakota, for example, the period when the crop canopies of all crop types close, is within the first week of July, no matter when the crop was planted. Canopy closure occurs when the plants grow together so that leaves exclude the ground from view. Spectral evaluation for discrimination of PP can therefore reliably be conducted in the Dakota region after the beginning of July. Other areas with different crops than the summer-grown wheat, sorghum, corn and soybeans of North Dakota and South Dakota and/or different planting and harvesting times, require evaluation of canopy closure for accurate application of the present invention.

Two Types of Prevented Planting from Wet Conditions

PP losses can be conveniently divided into two types of farmed terrain; that located within the prairie pothole region and that located within all other regions lacking prairie potholes. Prairie potholes are small to large lakes and ponds that are perennially wetted through catching runoff or through groundwater infiltration (FIG. 1). Prairie potholes are remnants of glaciation that occurred within the US in North and South Dakota and portions of neighboring Minnesota and Iowa.

Discriminating PP outside of the prairie pothole region is simpler and can use EOS data, alone, because all that is needed to discriminate a successful crop from a failed crop due to PP is a vegetation index threshold on EOS data obtained in July or August.

The prairie pothole region requires a more complex approach because prairie potholes are sites of vegetation growth, including verdant emergent aquatic vegetation such as cattails that confounds use of the vegetation index threshold for discriminating a competent versus a PP-failed crop. Thus, within the prairie pothole region, an extra step is necessary for discriminating competent from failed crops, and this is the mapping and removal of potholes from consideration. Eliminating potholes is accomplished in a geographic information system (GIS) by enclosing each pothole with a boundary called a polygon. The automated software is then instructed to not consider the area within the mapped pothole polygons, thereby avoiding confusion with successfully cropped portions of the field.

Potholes can be removed from indemnification by mapping them across all farmed lands appropriate for crop insurance. Because of the complexity for accurate identification of the pothole and the boundary within a cropped field, mapping of potholes must be accomplished individually and manually by a technician rather than be identified and mapped through automation. Mapping each pothole is time consuming and employs a GIS and high resolution imagery, for example from the readily available National Agriculture Imagery Program (NAIP). As a person with ordinary skill will recognize, methods that employ partial automation can greatly assist the pothole mapping process and reduce the time required to ten percent, or less, of strictly manual methods. NAIP imagery is available at 1 m resolution for all farmed lands in the US. Partial automation for mapping potholes can employ digital elevation model (DEM) data that is available at the appropriate resolution (3 m, or less, pixel size) throughout the prairie pothole region. Potholes are readily identified on NAIP imagery as polygons with marsh vegetation and water that are readily distinguishable from the surrounding cultivated land (FIG. 1). The NAIP imagery for FIG. 1 was taken in August during an extremely dry year—hence the potholes are nearly dry.

Removing potholes from consideration for indemnification within the prairie pothole region potentially can reduce the cost for insuring fields because the indemnified area is decreased by the collective areas of the potholes in each field. As of 2015, PP crop insurance does not discriminate potholes within the prairie pothole region and this is a source of great confusion and dissatisfaction because farmers do not know with certainty what will or won't be indemnified. Instead, farmers purchase insurance based upon the acreage that includes potholes even though they can't be farmed. Potholes are not practicable for cultivation because of their hydrologic connection while removing potholes by filling with additional soil is illegal according to provisions of the US Clean Water Act, Section 404 that deal with wetlands.

Removing mapped potholes from consideration for indemnification can be readily accomplished with GIS-based software. Once potholes are removed from consideration, it allows for crop insurance loss adjusting with completely automated methods using vegetation index thresholds in the same manner as for non-pothole-affected fields.

Figure 2:
FIG. 2. The FIG. 1 image with PP classified using an NDVI* threshold and SPOT6 Earth observation satellite (EOS) data (6-m resolution).

Choosing and Applying Vegetation Index Thresholds to Identify Prevented Planting Areas FIG. 1 is an image of prairie potholes that are enclosed by polygons that were mapped using a combination of NAIP imagery and DEM data within a GIS. FIG. 2 is the same location on a field with the PP classified using a threshold of early July, 2012 SPOT6 EOS data (6-m pixels). Preferentially, in operational mode the present invention can use a much larger pixel size, for example 20 m, that represents $1/10^{th}$ of an acre, the minimal area normally used for assessing losses in production crops (each 20-m pixel is 0.0988 acre; imagery is globally specified in the metric system while cropped land in the US is specified in acres).

A person having ordinary skill in the art will understand that a threshold to discriminate PP-loss areas from competent crop cover must be established through research that can be conducted a priori for each new area of interest (AOI). This threshold must balance the potential for weed growth, generally non-existent or very low density of cover that must also be identified as PP-affected within a cropped field. Light weedy cover such as may occur under PP crop failure will have an NDVI* value less than about 0.20 (NDVI* is calibrated as zero for bare soil). Competent crop cover with full canopy, for example established by the first week of July for crops in North and South Dakota has NDVI* of around 0.65 or greater. Therefore, a first order approximation to discriminate a competent crop from PP-failed locations in the Dakotas can simply set a threshold from the average of zero NDVI* and the 0.65 NDVI* lower limit for a competent crop. The resulting 0.325 NDVI* threshold is sufficiently high to avoid commission error for weedy cover while avoiding false classification of late-planted crops with lower-than-expected NDVI*. Thus, for the Dakotas, a NDVI* threshold of 0.325 safely, accurately, and robustly differentiates PP-failed areas from competent crops.

On FIG. 2, the classified PP areas can be seen to be pixilated with small portions of PP that were missed and show through the classified and overlayed PP pixels as lighter areas. Those with ordinary skill in the art will recognize that classification using one half of the expected median NDVI* for all competent crop canopies in the region will not bias the area classified as PP. Comparison of FIGS. 1 and 2 will disclose that the PP area not included by the classification is well balanced by those areas of competent crops included and within the classified pixels.

Flowcharts for a Workflow for Automated PP Crop Loss Adjusting

Figure 3:
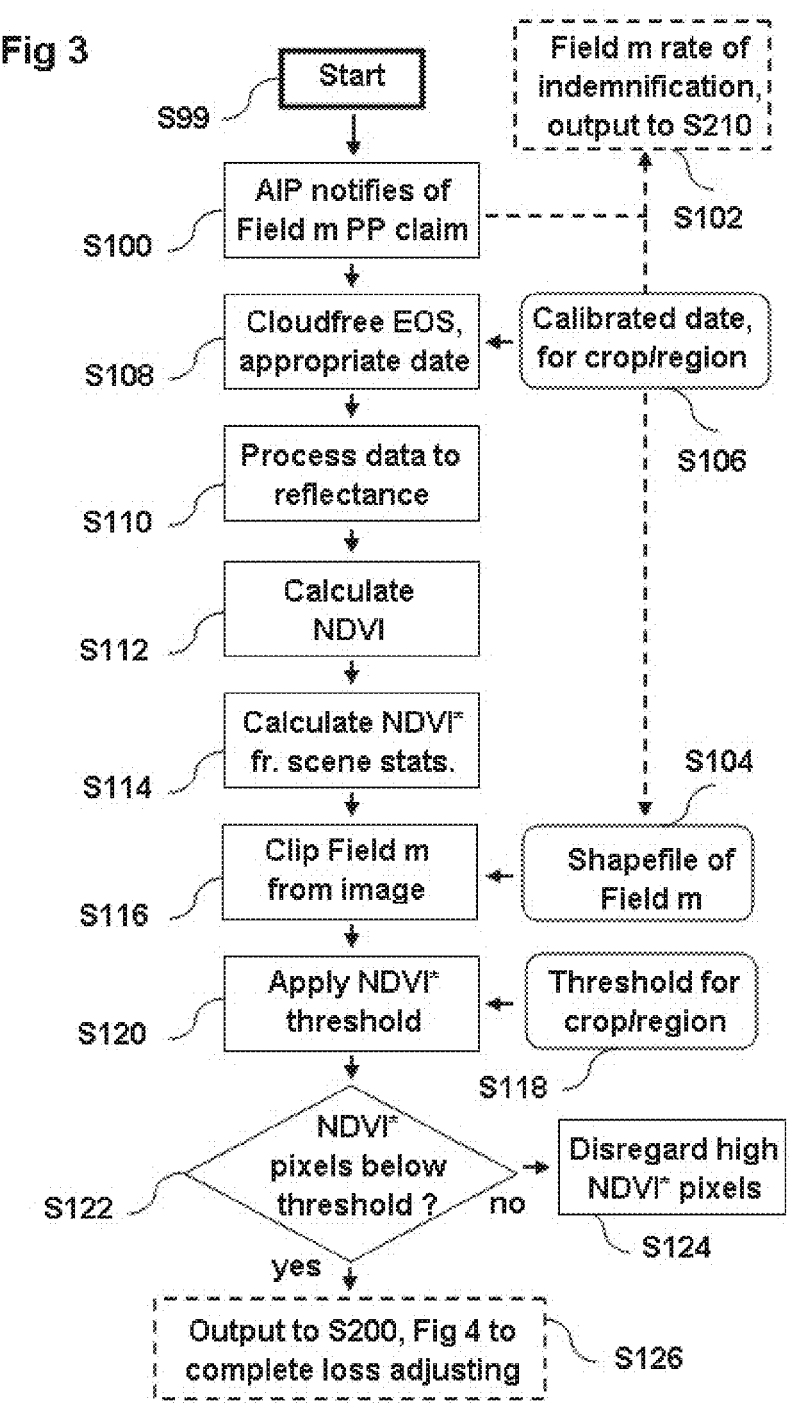
FIG. 3. Flowchart of the initial steps necessary for classification of PP on subject Field m for automated crop loss adjusting.

The flow charts are constructed from the perspective of a software-as-a-service to AIPs that incorporates the present invention. However, a person with ordinary skill will appreciate that the present invention could also be performed by an AIP without a software-as-a-service intermediary. Hence, both applications are included in the present invention. FIG. 3 presents a flowchart that provides the calculations necessary to determine the indemnity to be paid, while FIG. 4 provides the calculations and output of that indemnity for a generic "Field m".

The process of automated PP crop loss adjusting begins at S100 when the AIP notifies of a PP claim while also conveying data for performing the loss adjustment at S102 that includes the type of policy and the indemnification amount. This same information passes shapefiles to locate Field m boundaries at S104. Returning to S106, previous calibration work has identified the earliest possible date for obtaining an EOS image for PP identification within the AOI that are determined by crops and cultivation seasonality. This calibration determines the earliest safe date for canopy closure when at S108 a cloudfree EOS image can be sought for PP crop loss adjusting. Passing to S110, EOS data are processed to reflectance and at S112 used to calculate NDVI. At S114, NDVI* is calculated using scene statistics. At S116, the data for Field m is clipped from the image for further processing using the shapefiles from S104. All further calculations focus on the PP losses to any Field m.

The classification of PP occurs at S120 when a threshold of NDVI* is applied to discriminate PP from the surrounding verdant canopy within the cultivated field, the correct threshold having been determined earlier at S118 for the particular cropping and seasonal patterns of crop cultivation and growth for the region. Query block S122 asks whether each pixel's NDVI* values are below the calibrated PP threshold. A no answer leads to S124 in which pixels with NDVI* that are above the threshold are disregarded because they represent a competent crop. A yes answer, pixel NDVI* values are below the threshold, indicates that those pixels are affected by PP. At block S126, the PP-affected pixels are output to S200 of FIG. 4 for calculating the indemnity to be paid.

Figure 4:
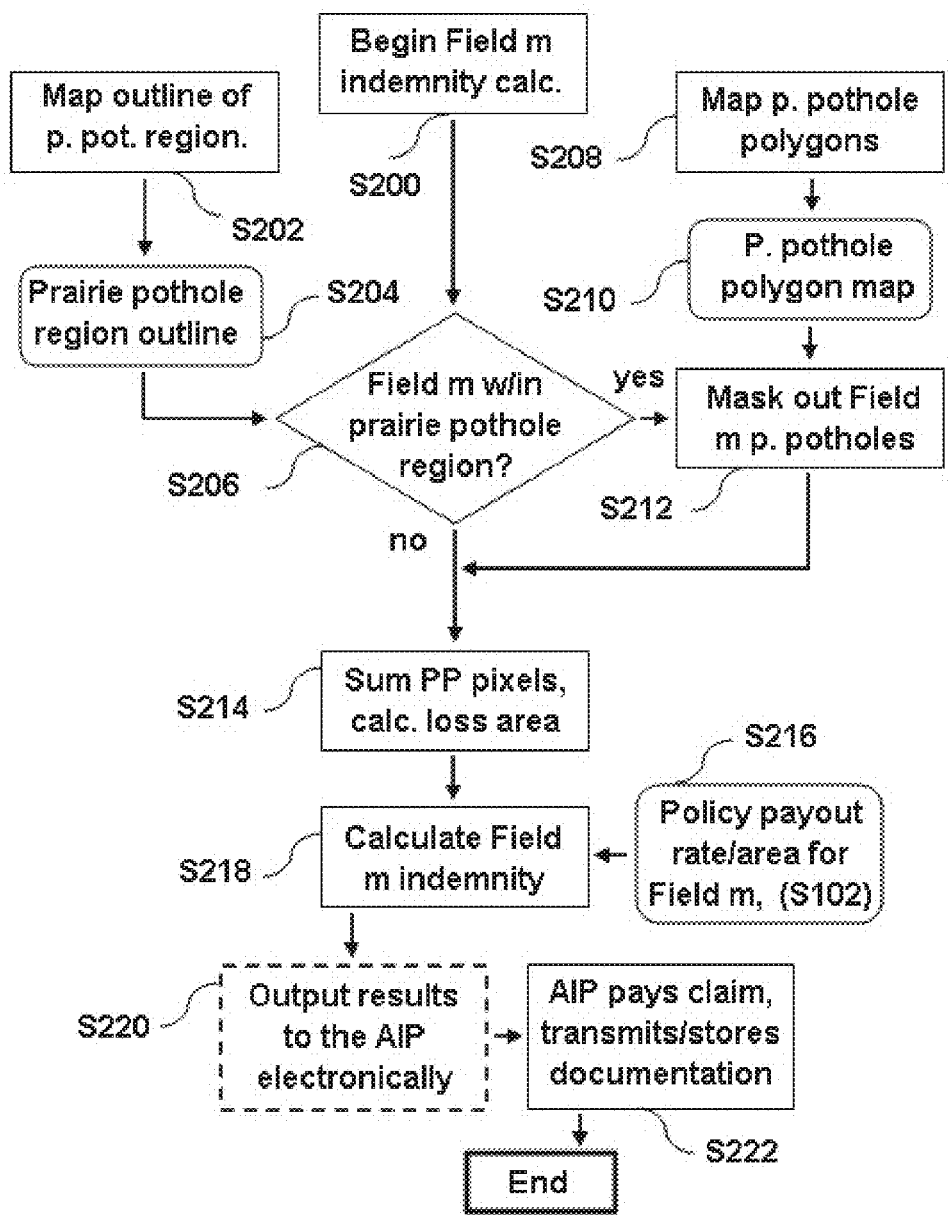
FIG. 4. Flowchart of the final steps necessary for automated crop loss adjusting of PP.

FIG. 4 calculates the payout for the PP crop loss on Field m starting at S200. S206 is a query for whether Field m is located within the prairie pothole region whose boundary is provided in an electronic map (as a shapefile) at S204 that is derived in a mapping effort at S202. If the answer to query S206 is yes, then the process passes to S212 that receives input from S210 that provides the shapefiles to mask prairie potholes from further consideration in a process that begins at S208.

The fields either within or outside of the pothole region are processed at S214 to sum all PP pixels that are in the cultivated land within each Field m for calculation of the total indemnity for the crop that was lost due to PP. Indemnity for PP is based upon area expressed as acres that results here from summation for each Field m of the area identified as PP-affected, converted into acres by the PP pixel fractional area multiplied by the number of pixels identified as PP. At S218, the payout is calculated using the indemnification rate per acre identified at S216 from data sent by the AIP with the notification of the claim at S100 that initiated the process. At S220 the product in the form of the indemnification and backup data is output electronically to the AIP that then pays the indemnity, sends documentation to the farmer of field m, and stores the documentation electronically for defense of the adjustment in the case of a challenge at S222 ending the process.

A preferred embodiment of the invention has been described but it will be understood by those of ordinary skill in the art that modifications may be made without departing from the spirit and scope of the invention of the system, method, and product. Accordingly, it is to be understood that the invention is not to be limited by the specific illustrated and described embodiments but only by the scope of the appended claims.

I claim:

1. A method for creating digital maps through remote sensing identification of areas of crop failure on an agricultural field identified as having crop loss due to prevented planting (PP) conditions, determining an area of failed crop, calculating an amount of compensation due for the crop loss, and transmitting this information to an approved insurance provider (AIP) of a crop insurance policy, comprising the steps of:

obtaining cloud free Earth observation satellite (EOS) data that measures reflectance in the visible and near infrared portions of the electromagnetic spectrum, the EOS data covering a region surrounding the agricultural field;

processing the EOS data to portray crop cover with an atmospherically-resistant vegetation index;

selecting cloud free EOS data for a point-in-time for expected continuous canopy cover, or thereafter when the cloud free EOS data become available;

extracting, with software and a shapefile that digitally defines boundaries of the agricultural field, vegetation index values for all pixels of the agricultural field;

digitally removing from consideration all pixels within the boundaries of the field that are not farmed, including field locations perennially too wet to plant;

identifying portions of the field where the vegetation index values are less than one half of an average vegetation index value for a competent crop whose canopy is continuous, thereby indicating areas of failed crop due to PP;

identifying portions of the agricultural field where the vegetation index values are less than a mathematical threshold for a healthy crop totaling pixels of the agricultural field with vegetation index values less than the mathematical threshold for a healthy crop and calculating a collective area of the pixels;

digitally mapping, across the agricultural field, the pixels of the area of failed crop;

using indemnity data received from the AIP to calculate a value of the crop loss on the agricultural field based upon the collective area;

transmitting electronically the collective area, the amount of compensation due, and a digital map of the areas of failed crop; and storing the map and the collective area to serve as documentation for a crop loss adjustment.

2. The method of claim 1 further comprising scaling the vegetation index to represent a full range of vegetation cover wherein bare soil is represented as a zero value, statistically-determined saturated values are represented as one, and all values in between scale proportionately.

3. The method of claim 1 wherein the atmospherically-resistant vegetation index is a version of normalized difference vegetation index (NDVI*).

4. The method of claim 1 further comprising removing all subareas that are not farmed from within the shape-file defined field boundaries, using additional shape files of the subareas mapped in separate steps.

5. The method of claim 4 wherein the subareas that are not farmed include at least one member from the group consisting of wetlands and subareas perennially not farmed due to wet soil.

6. The method of claim 1 wherein the step of identifying portions of the field where the vegetation index values are less than a mathematical threshold for a healthy crop further comprises counting only pixels whose index values are less than the threshold value.

* * * * *